W. H. BRISTOL.
INDICATING AND RECORDING HYGROMETER.
APPLICATION FILED OCT. 19, 1910.
1,098,472. Patented June 2, 1914.
2 SHEETS—SHEET 1.
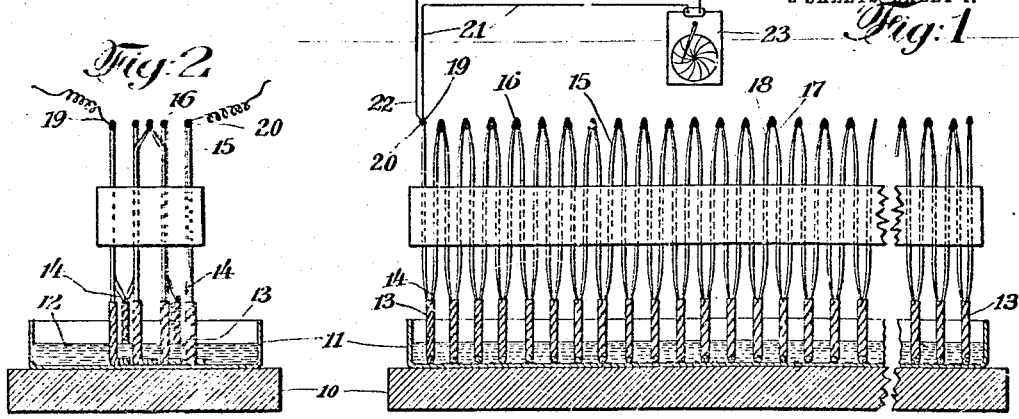
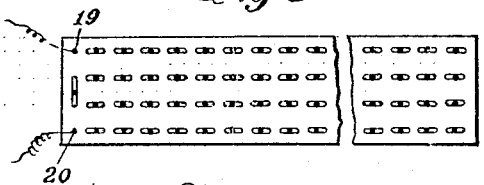
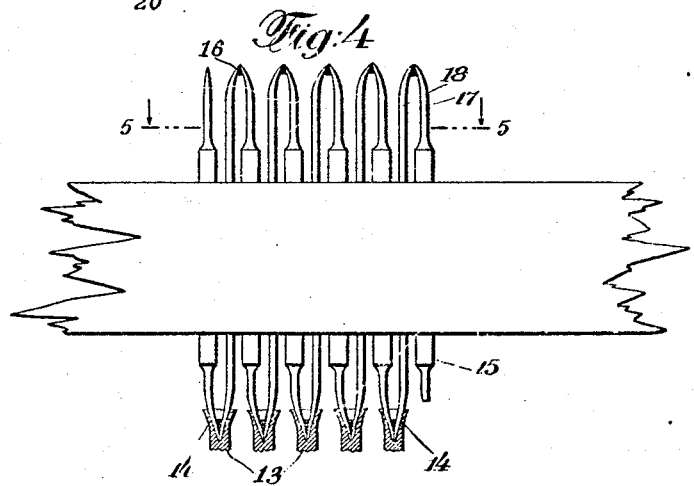
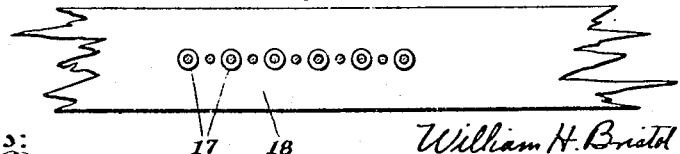
Witnesses: William H. Bristol Inventor
John E. Prager
Frank O. Holbrook By his Attorney Bea'l F. Schuets

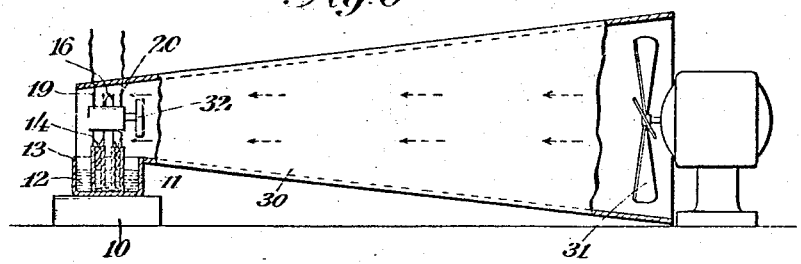
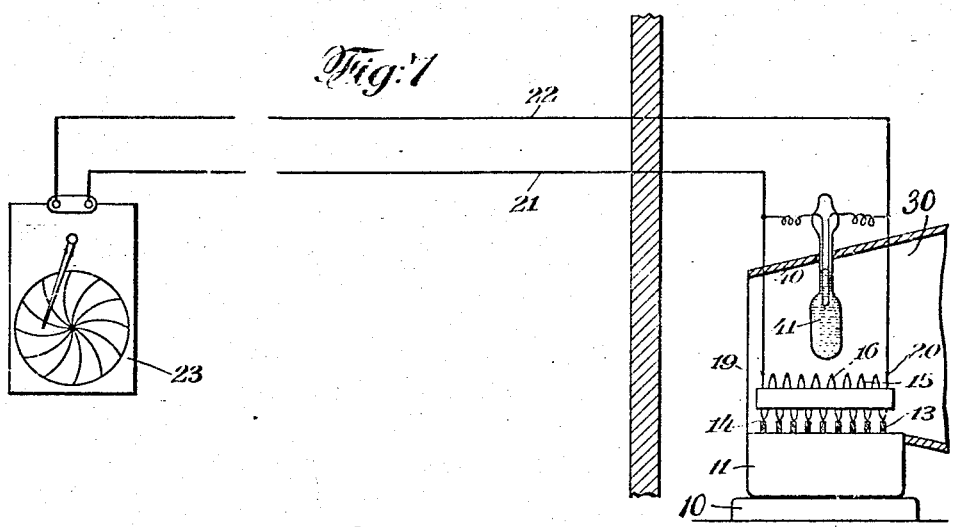
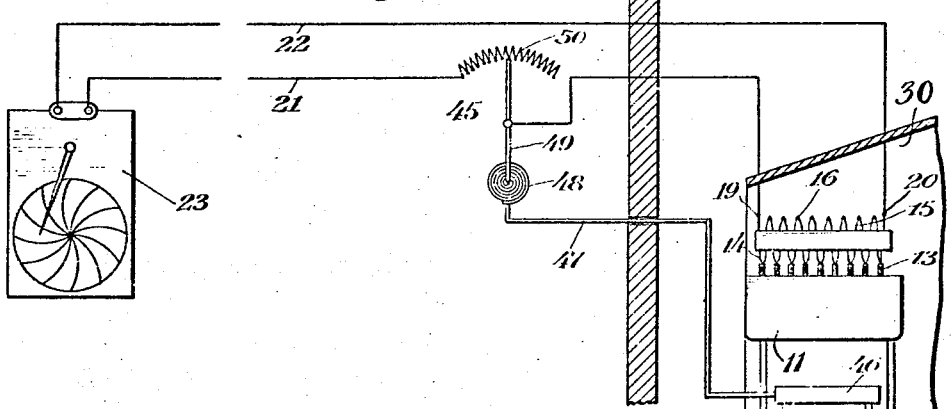

UNITED STATES PATENT OFFICE.

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

INDICATING AND RECORDING HYGROMETER.

1,098,472.     Specification of Letters Patent.     Patented June 2, 1914.

Application filed October 19, 1910. Serial No. 587,825.

*To all whom it may concern:*

Be it known that I, WILLIAM H. BRISTOL, a citizen of the United States, and a resident of Waterbury, in the county of New Haven and State of Connecticut, have invented certain new and useful Improvements in Indicating and Recording Hygrometers, of which the following is a specification.

The invention relates to indicating or recording devices, and particularly to an indicating or recording hygrometer.

It has for its object to provide a device of this character which will enable the indications set up thereby to be indicated or recorded at a distance from the actual point where the observation is taken.

To this end the invention consists essentially in the combination with an electrical indicating or recording device, of a thermo-electric couple, or battery of couples, one of whose ends is subjected to an evaporating medium whose rate of evaporation is proportional to the humidity present in the atmosphere under observation.

The nature of my invention will be best understood when described in connection with the accompanying drawings, in which—

Figure 1 is a front elevation of a battery of thermo-electric couples having one set of ends subjected to the evaporation of a suitable liquid, the battery being connected to an indicating or recording device. Fig. 2 is an end elevation of the same, the indicating or recording device, however, being omitted. Fig. 3 is a plan view, similarly omitting the indicating and recording device. Fig. 4 is a front elevation of a modified form of the battery of couples; and Fig. 5 is a horizontal section taken on the line 5—5, Fig. 4. Fig. 6 illustrates diagrammatically a modification in the installation of the said battery of couples. Figs. 7 and 8 illustrate the application of compensating means to correct for variations in the temperature of the atmosphere under observation.

Similar characters of reference designate corresponding parts throughout the several views.

Referring now to Figs. 1 to 3 of the drawings, 10 designates a suitable base or support for a container 11 which is adapted to retain a liquid 12, such as water, alcohol, ether or the like capable of evaporation in the atmosphere surrounding the same. Into the liquid 12 is adapted to dip one end of a wick or wicks 13 whose other end surrounds the joined end, or ends, 14 of one or more thermo electric couples 15 whose other end, or ends 16 are connected as hereinafter set forth. These couples are suitably mounted and connected in series, as shown; or they may be connected in parallel, or as sets of series couples in parallel, if desired. These couples are composed of suitable elements 17 and 18, such as an alloy of copper and nickel and copper respectively; and I prefer to reduce the ends of the same, as shown in Figs. 4 and 5, to insure greater sensitiveness of the couples. The terminals 19 and 20 of the battery of couples are connected by means of leads 21 and 22 respectively with a suitable indicating or recording device 23. In Fig. 6 I have illustrated this battery of couples located transversely at or near the outlet of a duct 30. A current of a suitable gas, such as air, is propelled through this duct by means of a suitable fan or the like 31, the gas being directed against the ends 14 as well as the ends 16, baffling means 32 being interposed in the path of the propelled gas. The wicks 13 dip into the liquid 12 of the container 11, which container may be suitably connected to the wall of the duct 30, as shown.

In Fig. 7 I have illustrated a thermometric rheostat 40, such as that disclosed in my prior U. S. Patent No. 800,792, shunted across the leads 21 and 22 and in close proximity to the ends 16 of the battery of couples. This rheostat is adapted, due to the rise and fall of the mercury 41 more or less short-circuiting the couples, to cause a decrease in the reading of the indicating or recording device 23 upon a rise of temperature in the surrounding atmosphere, and vice versa, to compensate the effect of a change of temperature upon the moisture retaining capacity of the said atmosphere about the apparatus and which capacity is not directly proportional to the variation of temperature.

Fig. 8 discloses a thermometric rheostat 45, located at a distance from the ends 16 of the said battery of couples, the said rheostat, however, being operated by the temperature existing at the said ends 16. This is accomplished through a bulb 46 in close proximity to the said ends 16 and communicating through a capillary tube 47 with a pressure tube 48. The bulb, capillary tube and pressure tube contain a suitable gas or liquid, expanding and contracting under the influence of the change in temperature, which causes the said pressure tube 48 to correspondingly move an attached arm 49 over a resistance 50. The arm 49 and resistance 50 are included in series with the lead 21 and are arranged to cut in or out resistance in the indicating and recording circuit to automatically compensate for the effect of changes in temperature at the said ends 16.

I do not wish to be restricted to any particular form of thermometric rheostat, as it is evident that many forms are applicable so long as they can be made to follow the law of variation of the hygrometer herein disclosed. In the type of thermometric device illustrated in Fig. 7 it will be required to shunt the same across the leads 21 and 22, the change in resistance being inversely proportional to the change in temperature. The thermometric device disclosed in Fig. 8 is so arranged that its change in resistance is directly proportional to the variations in temperature; and it must accordingly be included in series with the battery of couples to effect the desired compensation. The thermometric device may of course be arranged to operate in the reverse manner and the resistance 49 and arm 50 would then be required to be placed in parallel with the couples. I also do not wish to restrict myself to the particular arrangement of couples shown, nor to their particular construction.

The operation of the improved hygrometer is as follows: Assuming that the ends 16 of the couples are maintained at a substantially constant temperature, it will be evident that, due to the evaporation of the liquid from the wicks 13, the ends 14 of these couples will be at a lower temperature than the said ends 16. A difference of potential will consequently be established between these ends, producing a current whose effect is indicated or recorded by the indicating or recording device 23 which is located at any convenient point and at a distance from the thermo-electric couples if desired. By reducing the ends of these couples, as shown, a greater sensitiveness of the same is produced. When there is likely to be a disturbance of the indication, due to drafts of air and the like, I prefer to subject the said couples to a predetermined draft or current of air or the like, as illustrated in Fig. 6. Where it is not possible to maintain the ends 16 of the couples at a substantially constant temperature, an error may be introduced in the indication. For this purpose a thermometric rheostat as hereinbefore described is introduced to automatically compensate, by partly short-circuiting the couples or by varying the resistance of the entire circuit, for such variation in temperature.

I claim:—

1. In a hygrometer: the combination with an electrical measuring device, of a plurality of thermo-electric couples connected therewith, a liquid absorbing material surrounding one group of the ends of the same and adapted to dip into water to subject said group of ends to the evaporation of the water to vary the thermo-electric effect of said couples with the change of humidity of the surrounding atmosphere, and the other group of whose ends is subjected to the normal temperature of such surrounding atmosphere.

2. In a hygrometer: the combination with an electrical measuring device, of a plurality of thermo-electric couples connected therewith, a wick surrounding one group of the ends of said couples, and a container containing water for said wick, to subject said group of ends to the evaporation of the water to vary the thermo-electric effect of said couples with the change of humidity of the surrounding atmosphere, and the other group of whose ends is subjected to the normal temperature of such surrounding atmosphere.

3. In a hygrometer: the combination with an electrical measuring device, of a plurality of thermo-electric couples connected therewith, having their ends of reduced cross-section, a liquid absorbing material surrounding one group of the ends of the same and adapted to dip into water to subject said group of ends to the evaporation of water to vary the thermo-electric effect of said couples with the change of humidity of the surrounding atmosphere, and the other group of whose ends is subjected to the normal temperature of such surrounding atmosphere.

4. In a hygrometer: the combination with an electrical measuring device, a duct, and means to cause air to pass therethrough, of a plurality of thermo-electric couples connected with said measuring device and located in the path of said air, a liquid absorbing material surrounding one group of the ends of said thermo-electric couples and adapted to dip into water to subject said group of ends to the evaporation of the water to vary the thermo-electric effect of said couples with the change of humidity of the surrounding atmosphere, and the other group of whose ends is subjected to the normal temperature of such surrounding atmosphere.

5. In a hygrometer: the combination with an electrical measuring device, a duct, and means to propel a suitable gas therethrough, of a plurality of thermo-electric couples connected with said indicating or recording device and located in the path of said propelled gas, one group of the ends of said thermo-electric couples being subjected to the evaporation of water to vary the thermo-electric effect of said couples with the change of humidity of the surrounding gas, and the other group of whose ends is subjected to the normal temperature of such surrounding gas, and temperature compensating means electrically connected with said thermo-electric couples.

6. In a hygrometer: the combination with an electrical measuring device, a duct, and means to propel a suitable gas therethrough, of a plurality of thermo-electric couples connected with said indicating or recording device and located in the said duct in the path of said propelled gas, one group of the ends of said thermo-electric couples being subjected to the evaporation of water to vary the thermo-electric effect of said couples with the change of humidity of the surrounding gas, and the other group of whose ends is subjected to the normal temperature of such surrounding gas, and a thermometric rheostat electrically connected with said thermo-electric couples.

Signed at New York, in the county of New York and State of New York this 18th day of October A. D. 1910.

WILLIAM H. BRISTOL.

Witnesses:
 FREDK. F. SCHUETZ,
 LAURA E. SMITH.